Sept. 15, 1936.  J. H. MOSEL  2,054,437
APPARATUS FOR BUILDING ROADS
Filed Dec. 31, 1934  7 Sheets-Sheet 1

INVENTOR.
Joseph H. Mosel.
BY
ATTORNEYS.

Sept. 15, 1936.   J. H. MOSEL   2,054,437
APPARATUS FOR BUILDING ROADS

Filed Dec. 31, 1934   7 Sheets-Sheet 2

INVENTOR.
Joseph H. Mosel.
BY
ATTORNEYS.

Sept. 15, 1936.  J. H. MOSEL  2,054,437
APPARATUS FOR BUILDING ROADS
Filed Dec. 31, 1934  7 Sheets-Sheet 3

INVENTOR.
Joseph H. Mosel.
BY
ATTORNEYS.

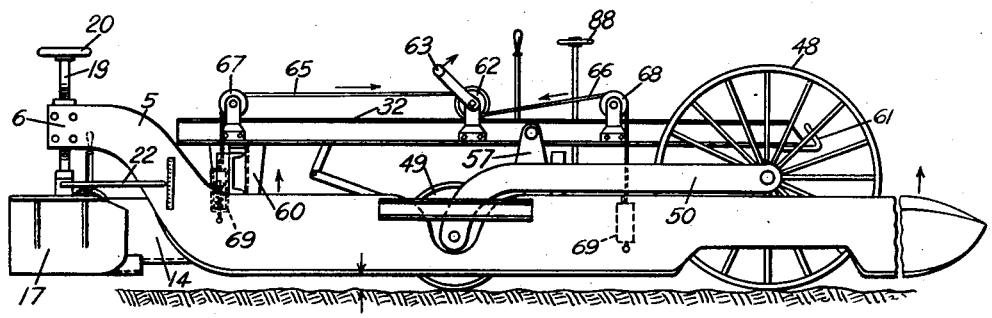
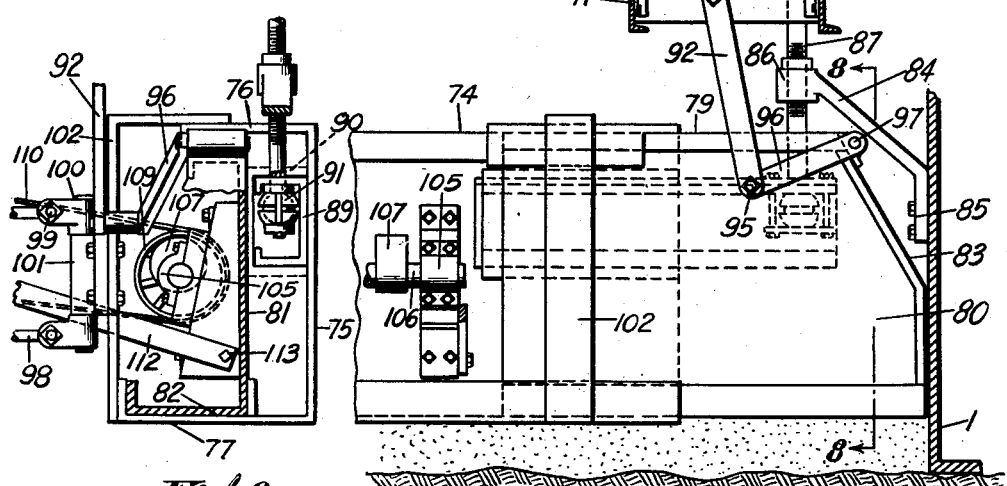
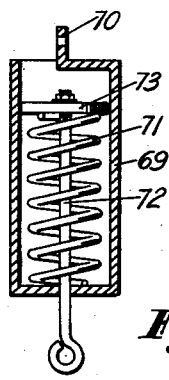

Sept. 15, 1936.　　　J. H. MOSEL　　　2,054,437
APPARATUS FOR BUILDING ROADS
Filed Dec. 31, 1934　　　7 Sheets-Sheet 5

INVENTOR.
Joseph H. Mosel.
BY
ATTORNEYS.

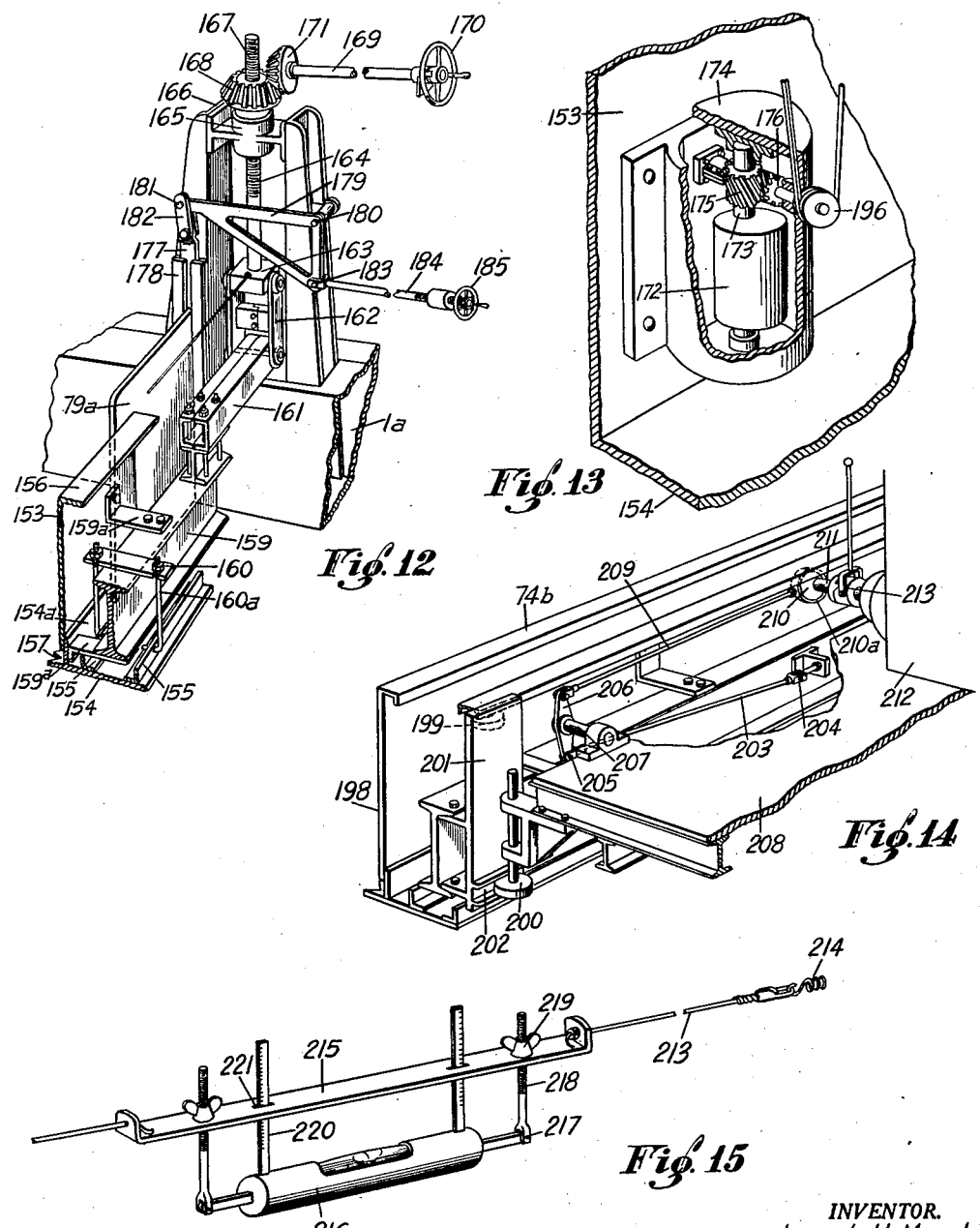

Sept. 15, 1936.   J. H. MOSEL   2,054,437
APPARATUS FOR BUILDING ROADS
Filed Dec. 31, 1934   7 Sheets-Sheet 7

INVENTOR.
Joseph H. Mosel.
BY
ATTORNEYS.

Patented Sept. 15, 1936

2,054,437

UNITED STATES PATENT OFFICE 2,054,437

APPARATUS FOR BUILDING ROADS

Joseph H. Mosel, Columbus, Ohio, assignor to The Jaeger Machine Company, Columbus, Ohio, a corporation of Ohio Application December 31, 1934, Serial No. 759,928

27 Claims. (Cl. 94—46)

My invention relates to apparatus for building roads. It has to do, more specifically, with apparatus which is adapted to receive bituminous mixes or other materials and to spread it across a surface to be covered, forming therefrom a layer or slab of the desired thickness and contour and having straight edges. However, there are features of my invention not necessarily limited to the spreading of asphalt or other bituminous materials.

In the past, there have been several machines devised for this purpose. However, these prior art devices are not entirely satisfactory in operation. This type of machine is sometimes used for spreading asphalt or other material over an old roadbed or over a roughly graded or other rough surface. The prior art machines which have been used for this purpose are of such structure that irregularities in the surface being covered are reproduced or not sufficiently eliminated in the new surface produced. Thus, it is practically impossible to produce, with the prior art machines, a surface which is even and which does not have a large number of raised and depressed portions, unless the surface which is being covered is already finished evenly. Another disadvantage of some of these prior art machines resides in the fact that it is necessary to employ side forms upon which the machine operates in order to limit the spreading of the material and produce a surface with straight edges. It is obvious that these side forms are expensive and that it requires a large amount of labor and expense to install them.

One of the objects of my invention is to provide apparatus of the type indicated which will receive asphalt or other bituminous or other material and which will spread such material across the surface to be treated in a very efficient manner and form therefrom a layer or slab of the desired thickness and contour which layer will have straight edges.

Another object of my invention is to provide apparatus of the type indicated which will form the layer or slab with straight edges without the use of side forms that are set along the edges of the surface to be covered.

Another object of my invention is to provide apparatus of the type indicated which is particularly adaptable to the spreading of material over an old road bed or over a roughly graded or other rough surface, the apparatus being of such a nature that the longitudinal irregularities in the surface being covered will be practically eliminated in the surface produced by the machine and, consequently, the machine will produce a surface which is very even and which will not be "wavy".

Another object of my invention is to provide a machine which is of such a nature that irregularities longitudinally of the surface being covered will have substantially no effect on the surface produced by the machine, which is provided with means for indicating the level of the screed at all times, based upon a given grade line, so that the screed may be readily adjusted to compensate for transverse irregularities in the surface being covered.

In its preferred form, my invention contemplates the provision of road building apparatus comprising an outer unit which includes a pair of runners that are adapted to be drawn along the surface to be covered. These runners serve as side forms for limiting spreading of the material on the surface to be covered, thereby producing straight edges on the layer or slab produced by the machine. These runners are of considerable length and the associated parts are so related thereto, that even though they do operate over a rough surface, the effect of the longitudinal irregularities in the surface being covered upon the surface produced by the machine will be negligible.

Associated with the runners, a second unit is disposed and is so associated with the runner unit that it may float up and down without having any effect whatsoever on the runner unit. This second unit is carried by traction members which operate outside of the inner edges of the runners. It carries a hopper which extends entirely across the machine and is adapted to receive the asphalt or other material. In the lower portion of this hopper, a spreading member is mounted which will spread the material laterally in both directions across the surface to be covered and will compact it against the runner members which will serve as side forms. A screed member is provided on the machine behind the spreading member for levelling off the material spread by the spreading member to the desired thickness and contour. This screed member is carried by the runner unit; inasmuch as the runner unit is not affected to any material extent by the irregularities in the surface being covered. Consequently, even though the surface on which the machine operates is rough, the surface produced by the machine will be very even.

I preferably provide adjustable means at each end of the screed member which permit some of the material to pass rearwardly of the screed member. On the rear end of each of the runners, I provide an auxiliary screed member which levels off the material that bleeds past the corresponding end of the main screed member. These auxiliary screed members are so disposed that they feed the material laterally so that it will cover that portion of the rough surface over which the runners have operated or, in other words, will produce a layer of material which is wider than the distance between the runners themselves.

I also provide means for indicating the level of the screed, based upon the given grade line, so that it may be readily adjusted to prevent transverse irregularities in the surface being covered from being reflected in the surface produced by the machine. As stated, the longitudinal irregularities in the surface being covered will have substantially no effect on the surface produced by the machine since the screed member is carried by the long runner members.

The preferred embodiment of my invention is illustrated in the accompanying drawings wherein similar characters of reference designate corresponding parts and wherein:

Figure 7 is a side elevation illustrating how the runner unit may be raised and supported on the inner unit for transportation.

Figure 8 is a detail partly in section and partly in side elevation taken substantially along line 8—8 of Figure 9.

Figure 9 is a detail showing the adjustable means at the end of the screed member which may be adjusted to permit bleeding of material rearwardly past the end of the screed member.

Figure 10 is a section illustrating a spring and a housing therefor, such spring being one used in tying the runner unit to the inner spreading unit so that it will be partly supported by the inner unit.

Figure 12 is a detail in perspective showing one end of the screed of the machine of Figure 11, the means for vertically adjusting the end thereof, and the material bleeding means of this machine.

Figure 13 is a detail in perspective, partly broken away, of the means for causing transverse vibration of the screed member.

Figure 14 is a perspective view showing different means for causing transverse reciprocation of the screed.

Figure 15 is a perspective view showing the indicating means which I preferably use on the screed for indicating whether or not the screed is properly adjusted during operation of the machine.

*The outer or runner unit*

Figure 1:
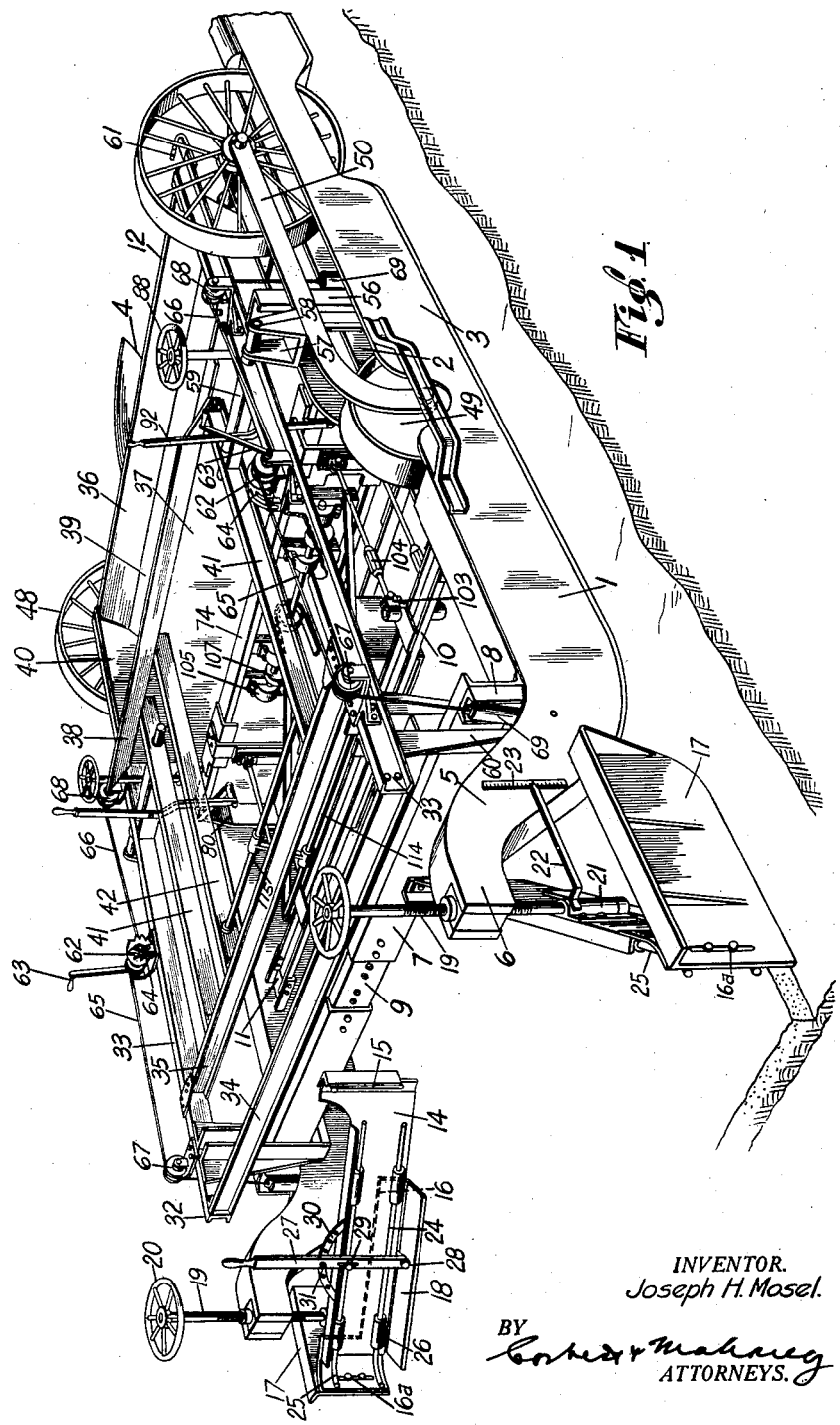
Figure 1 is a perspective view of a road building machine constructed in accordance with the principles of my invention.

With reference to the drawings, and particularly to Figures 1 to 7 inclusive, I have shown my apparatus as comprising a pair of runner members 1, one of which is disposed at each side of the machine. These runner members are adapted to slide along the surface to be covered by material spread by the machine.

The runner members are preferably constructed as indicated in the drawings and are made of metal. They are preferably of hollow construction and embody an inner plate 2 and an outer plate 3 which are spaced apart and which are joined together at their upper and lower edges as indicated. The forward end of each of the runners has its bottom upwardly curved as indicated at 4 (Figure 2) so that there will be no danger of it digging into the surface upon which it slides. The rear end of each runner is curved upwardly as indicated at 5 and then rearwardly to form a rearwardly projecting horizontal portion 6 which is at a much higher level than the body portion of the runner.

Figure 5:
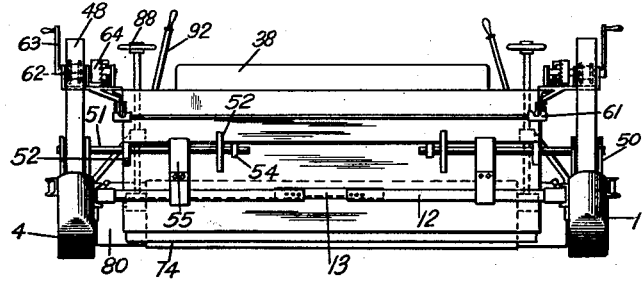
Figure 5 is a front elevation of the machine.
Figure 6:
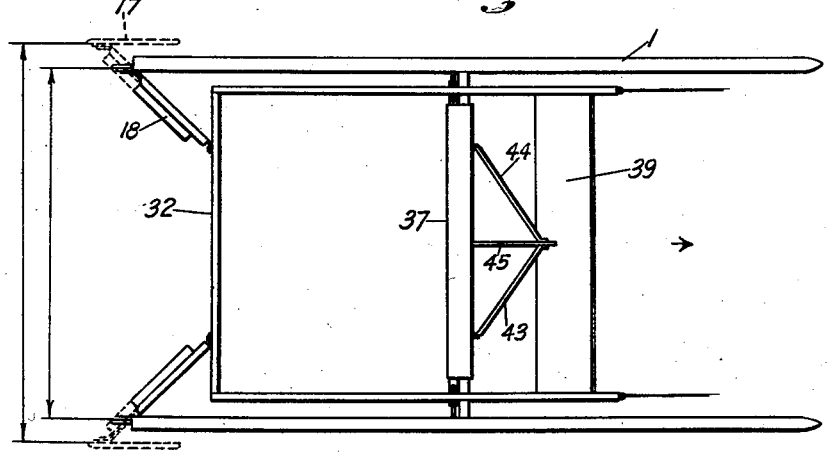
Figure 6 is a plan view, more or less diagrammatic, illustrating how the adjustable auxiliary screed members on the rear ends of the runners may be adjusted so that the portion of the rough surface over which the runners slide may be covered.

The two runners are rigidly secured together adjacent their rear ends by a beam unit 7, the ends of which are bolted or otherwise secured to supports 8 which are disposed between the inner and outer plates of the runners and project upwardly from the upper edge thereof. This beam unit 7 is provided with a telescoping section 9 interposed substantially midway between the ends thereof. By this telescoping section it is possible to make the beam unit longer or shorter and thereby increase or decrease the distance between the two runners. Forward of the beam unit 7 another beam 10 is provided for securing the runners together and for another purpose to be described subsequently. This beam is horizontally disposed and each end thereof is removably bolted to an inwardly projecting member 11 on each runner. A plurality of sets of openings for the bolts are provided so that the distance between the two runners may be varied. The forward ends of the two runners are held together by a transversely extending beam 12 (Figure 5). The ends of this beam are secured to the inner surfaces of the runners and this beam is provided with a telescoping section 13 which permits the distance between the two runners to be varied.

At the rear end of each of the runners I provide an auxiliary screed structure which cooperates with the main screed structure in a manner to be described subsequently. Each of these auxiliary screed structures comprises a vertically disposed plate 14 which has its inner end connected to the transversely extending beam 7 by a slot and pin connection 15 so that it will be vertically adjustable. This plate 14 extends rearwardly and outwardly at an angle. A second vertically disposed plate 16 overlaps the plate 14 and extends outwardly past the outer end thereof. A longitudinally extending reinforced delimiting plate structure 17 is secured to the outer end of plate 16 by means of bolt and slot connections 16a so that plate 17 may be vertically adjusted relative to plate 16. The plate 16 is provided with a horizontally disposed flange 18 on its lower edge which projects rearwardly beneath the lower edge of plate 14.

I provide means for vertically adjusting the entire auxiliary screed unit and this means comprises a shaft 19 which is threaded downwardly through a suitable bearing disposed in the portion 6 at the extreme rear end of the runner. A hand wheel 20 is provided for operating this shaft 19 and the lower end of the shaft is secured in a member 21 which is attached to the front surface of the plate 14. By adjusting shaft 19 the entire unit including plates 14, 16, and 17 may be vertically adjusted. An indicator pointer 22 is mounted on plate 14 and projects into cooperative relation with graduations 23 on the runner for indicating the height of the auxiliary screed unit.

I also provide means for adjusting the plates 14 and 16 longitudinally of each other to vary the effective length of the auxiliary screed unit. As shown, this means embodies a pair of rods 24 having their outer ends welded or otherwise secured to plate 16 as at 25. These rods extend through guide members 26 and are free to slide therein. The guides 26 are disposed on the rear surface of plate 14. A lever 27 has its lower end pivotally connected to the plate 14 as at 28. This lever is connected intermediate its ends to the upper rod 24 by a pin and slot connection 29. An arcuate bar 30 is disposed on the upper edge of plate 14 and is provided with a plurality of openings through any one of which a bolt 31, that also passes through the lever 27, may pass. It will be apparent that by removing bolt 31 and swinging the lever in either direction, the plates 14 and 16 will be moved longitudinally of each other and the effective length of the auxiliary screed member will be varied. This adjustment will also cause movement of plate 17 which may be moved into alignment with the runner or may be moved to a position where it is spaced outwardly therefrom. The function of this auxiliary screed member will be described more in detail hereinafter.

*The inner or spreading unit*

Within the runners 1, a second unit is disposed and this unit may float up and down without having any effect whatsoever on the unit of which the runner members 1 form a part. This unit embodies a main frame 32 which comprises a pair of longitudinally extending side beams 33 which are joined together adjacent their rear ends by transversely extending beams 34 and 35. The forward ends of these longitudinally extending beams 33 are joined together by a hopper structure 36. This hopper structure embodies a vertically disposed plate 37 having a rearwardly inclined upper edge 38 which serves as the rear wall of the hopper and a forward plate 39 which serves as the forward wall of the hopper. The plate 39 is inclined rearwardly and downwardly as indicated so that the upper open end of the hopper will be wider than the lower end thereof. This hopper member has its ends closed by vertically extending plates 40. The hopper is adapted to receive the material which is to be spread on the surface to be covered. Longitudinally extending beams 41 have their rear ends bolted to the transverse beam 35 and their forward ends bolted to the plate 37 which serves as the rear wall for the hopper. These beams 41 are parallel to beams 33 and each of them is spaced an equal distance from the beam 33 on the corresponding side. Another longitudinally extending beam 42 is disposed between beams 41 and has its rear end bolted to transverse beam 35 and its forward end to the plate 37.

Figure 2:
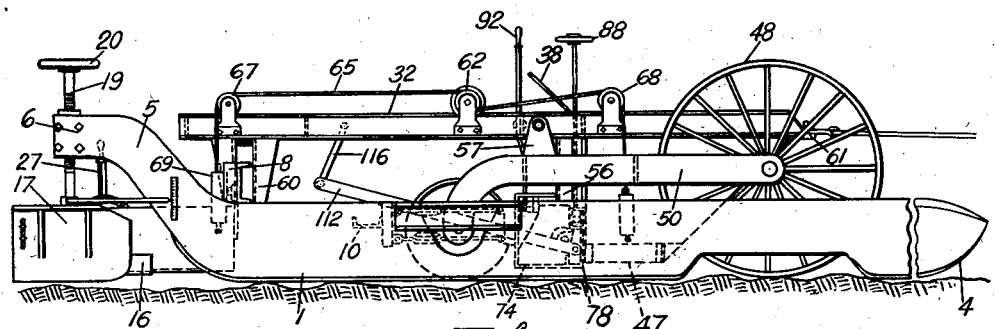
Figure 2 is a side elevation of the machine.
Figure 3:
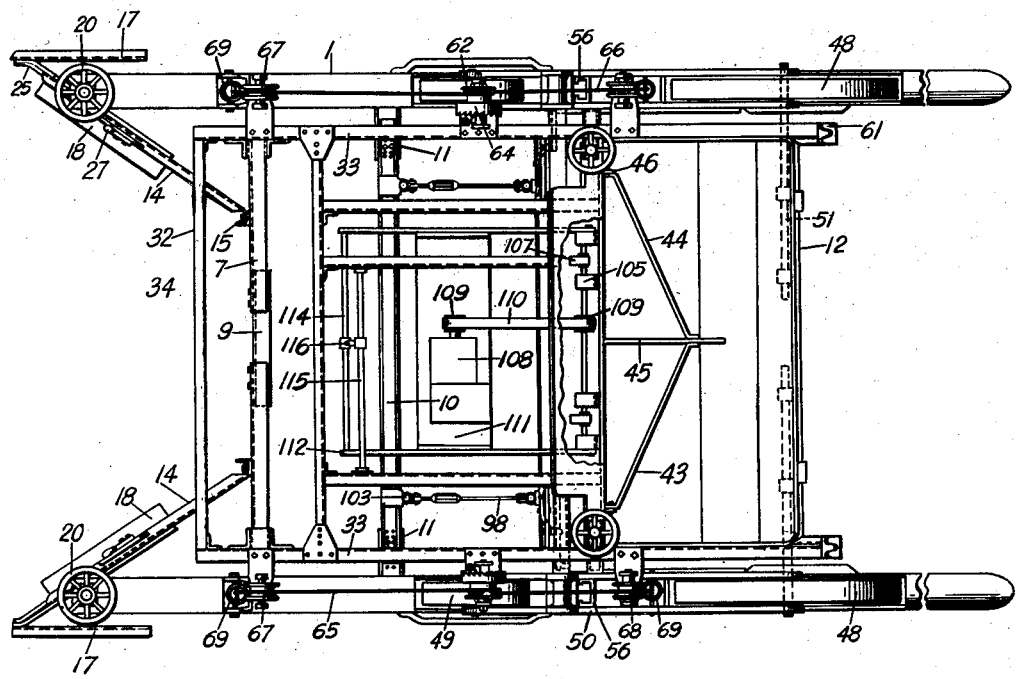
Figure 3 is a plan view of the machine.
Figure 4:
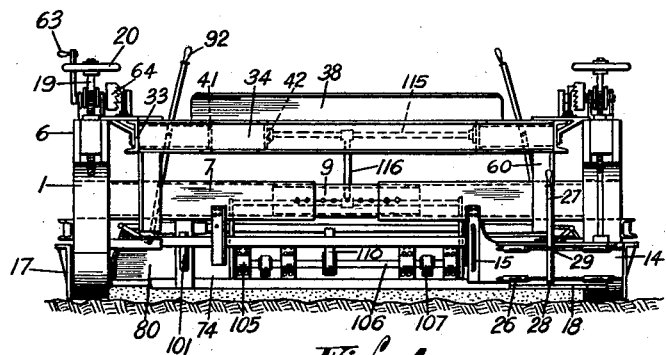
Figure 4 is a rear elevation of the machine.

In the bottom of the hopper I provide a spreading member 43 for spreading the material which is dumped in the hopper laterally towards the runners. This spreading member 43 embodies a pair of wide blades 44 which have their inner ends adjacent each other and connected to the outer end of a forwardly extending support 45. The rear end of this support 45 is secured to the rear wall 37 of the hopper. The blades 44 are so arranged that they extend outwardly and rearwardly at an angle and their outer ends are attached to the rear wall 37 of the hopper as at 46. As shown in Figure 2, the bottom of the hopper terminates at a point 47 which is spaced above the lower edge of the runner. Also the bottom edges of the wide blades 44 are substantially in line with the lower edge of the hopper. It will be apparent that the blades 44 will feed the material dumped in the hopper laterally across the surface to be covered and against the inner surfaces of the runners which will serve to shape the edges of the layer produced.

I provide traction means for supporting the inner or spreading unit for movement along the surface to be covered. These traction means preferably comprise a pair of large forward wheels 48 and a pair of small rear wheels 49. The wheels operate along the same paths as the runners. All of these wheels are disposed between the inner and outer plates of the runners extending through slots formed therein and resting on the surface along which the machine moves. Each of the wheels 48 is mounted at the forward end of an arm structure 50 embodying spaced parallel bars and each of the wheels 49 is mounted at the rear end of such arm structure. Each of the axles 51 upon which the wheel 48 is mounted extends inwardly (Figure 5) and is slidably supported in bearing members 52 secured to the outer surface of the hopper structure of the inner unit. The axle is free to slide in the bearing members so that even though the wheels are disposed within the runners, the distance between the runners may be increased or decreased. A stop 54 is provided at the extreme inner end of each of the axles to prevent complete withdrawal of the axle from the bearing members 52. Vertically disposed guide members 55 project upwardly from the beam structure 12 of the runner unit and are provided with guideways or slots in their upper ends within which the axles may move up and down. Thus, the wheels and axles may rise and fall without affecting the runner unit. A guide member 56 has its lower end disposed between the inner and outer plates of the runner unit (Figure 1) and projects upwardly between the spaced parallel bars of the arm 50. This member 56 serves to guide vertical movement of arm 50 and prevents the wheels 48 and 49 from contacting with either the outer or inner plates of the runners.

The inner or spreading unit is supported on the traction wheel structure in the following manner. Each arm structure 50 is provided with a vertically extending yoke 57 which has the outer end of a pivot pin 58 mounted in the upper ends of the arms thereof. This pivot pin 58 extends inwardly into a pipe 59 within which it rotates and which is supported by a beam 33 and beam 41.

The pivot pin 58 is slidably mounted in the pipe 59 so as to permit varying of the distance between the runner units and consequently the distance between the wheels on opposite sides of the machine. Thus, the inner unit is supported on the arms 50 which are supported on the traction wheels by pivotal connections directly opposite each other. The inner unit is free to rock about these pivot points. The beam 34 of the inner unit is provided with slotted depending members 60 through which the beam unit 9 passes. Thus, the rear end of the inner unit may move up and down without having any effect on the runner unit. The depending members 60 which cooperate with beam unit 7 at the rear of the machine and the upstanding members 55 at the forward end of the machine serve to tie the inner unit, which is carried by the traction wheels, to the outer runner unit in such a manner that when the inner unit is moved along the surface to be covered, the outer or runner unit will be dragged along therewith. Also, the inner unit is tied to the outer unit in such a manner that when the traction wheels strike irregularities in the surface upon which they operate, the inner unit will be caused to float up and down without having any effect whatsoever on the horizontal position of the runner unit. The forward end of the inner unit is provided with hooks 61 so that means may be atached thereto for pulling the machine along the surface to be covered.

It will be apparent that as the machine moves along, the runners will slide along over the surface which is being treated. In order to reduce the sliding friction of the runners and also to provide means for supporting the runner unit on the inner unit entirely with the runners spaced from the ground for purpose of transporting the machine to a different location, I provide the following structure (see Figure 7).

At each side of the machine a drum member 62 is mounted for rotation. The drum member may be rotated by means of a crank 63 and ratchet mechanism 64 is provided for preventing rotation of the drum in one direction. A rearwardly extending cable 65 has its forward end attached to the drum and winds around the drum in one direction. A forwardly extending cable 66 has its rear end secured to the drum and winds therearound in an opposite direction. The cable 65 passes rearwardly and then downwardly over a pulley 67 mounted on the rear end of beam 33 and its lower end is connected to the rear end of the runner on the corresponding side. The other cable 66 passes forwardly and then downwardly over a pulley 68 rotatably mounted on beam 33 at a point in front of the pivot pin 58 and its lower end is connected to the runner.

In Figure 10 I show a spring structure which I preferably employ for connecting the lower end of each of the cables to the runner unit. This structure embodies a spring housing 69 having an upstanding lug 70 on the upper end thereof to which the cable is attached. A compression spring 71 is disposed in the housing in surrounding relation to a rod 72 which passes through an opening in the bottom of the housing. This rod has a head or disk 73 on its upper end. The lower end of the rod is adapted to be connected to the runner. It will be apparent that this provides a resilient connection between the ends of the cables and the runners.

During normal operation of the machine the crank 63 is rotated to cause rotation of the drum 62 to such an extent that the runner will just rest on the surface. Although the runner will contact with the ground, it will be partially and resiliently supported by the inner unit and the amount of friction developed will be materially reduced by the cables and spring structures. When the drum 62 is rotated in one direction it winds both cables 65 and 66 thereon thereby causing raising of the runner unit. If the ratchet is released to permit rotation of the drum in an opposite direction, both of the cables will unwind from the drum and the runner unit will be lowered. For the purpose of transporting the machine to a different location, the drums may be rotated to cause the runner unit to be raised so that it will be completely supported on the inner unit and consequently upon the traction wheels so that the runners will be spaced from the ground, as shown in Figure 7.

*The screed unit*

As previously stated, it is very important to have a machine of this type made in such a manner that longitudinal irregularities in the surface being covered will be practically eliminated in the surface produced by this machine. I provide a screed member which levels off the surface of the material spread by the spreading unit and which makes the layer the desired thickness and contour. This screed is so mounted that it will not be materially affected by longitudinal irregularities in the surface being covered and over which the machine passes. As previously stated, the runner members 1 may pass over a rough surface to be covered but since they are of such great length, the longitudinal irregularities in the surface do not materially affect the outer runner unit to any material extent. Therefore, it is desirable to have the screed unit, which determines the contour and thickness of the layer of material or, in other words, produces a finished surface, mounted on the outer runner unit. Also, it is desirable to have the screed member located substantially midway between the ends of the runners, so that any irregularities over which the runners do pass, will have the least effect on the position of the screed.

The screed member 74 is illustrated best in Figures 1, 8, and 9 and consists mainly of a plate member which has a vertically disposed forward portion 75 which has a rearwardly extending flange 76 on its upper edge and a rearwardly extending shoe or surfacing member 77 on its lower edge. The forward portion 75 of the screed will contact the material which is spread by the spreading member and the shoe 77 will level it off and finish it. Suitable means (not shown) is provided for producing the desired crown in the shoe or finishing surface 77 so as to impart the desired crown to the surface to be produced. The screed member 74 is disposed directly behind the rear wall of the hopper member, the forward member 75 of the screed overlapping the rear wall 37 of the hopper. However, the surfacing member 77 of the screed will always be disposed below the lower edge of the wall 37, as indicated at 78 in Figure 2.

The screed 74 is provided with an adjustable telescoping section 79 at each end thereof whereby it is possible to permit material to bleed past the ends of the screed member for a purpose to be described. As shown in Figures 8 and 9, each section 80 is so shaped that it may slide in and out of the end of the screed 74. This section 80 has a forward wall 81 which is spaced behind the wall 75 of the screed proper and a shoe or surfacing portion 82 which projects rearwardly therefrom. The extreme outer end of section 79 is provided with a vertically extending wall 83.

The screed member 74 is suspended from the runner unit in such a manner that each end may be adjusted independently of the other to the proper level. This will determine the thickness of the layer of material produced. This suspending means comprises an inwardly projecting support 84 which has its outer end bolted to the runner unit 1 as at 85 and has a threaded bearing 86 on its inner end. A threaded vertical shaft 87 is threaded through this bearing 86. This shaft may be rotated by a hand wheel 88. The screed 74 has an outwardly projecting extension 89 which has its inner end telescoping in a guideway 90 on the screed. The lower end of the shaft 87 is connected to the outer end of extension 89 by means of a ball and socket connection 91 which will permit one end of the screed to be raised higher than the other end without binding and also will permit tilting of the screed about its own axis. Since the extension 89 telescopes with the guide 90 at the end of the screed and since the section 79 telescopes with the end of the screed, this will not interfere with adjustment of the two runners towards and away from each other.

I provide means for adjusting each section 79 at the end of the screed from its position indicated in Figure 9, where its outer end is disposed substantially in contact with the inner surface of runner 1 to a position where the end thereof is spaced from the inner surface of the runner. In this latter position, material will be permitted to bleed back past the ends of the screed member. This means comprises a lever 92 which is pivoted as at 93 to a support 94 that is attached to longitudinally extending beams 33 and 41 of the inner unit. The lower end of this lever is pivoted as at 95 to a link 96 which has its opposite end pivoted to the upper and outer corner of the section 79 as at 97. It will be apparent that by swinging lever 92, the section 79 will be caused to slide into and out of the end of screed member 74 so that the end of the section will be directly adjacent the inner surface of the runner, as indicated in Figure 9 to prevent passage of material past the screed member, or the end of the section will be spaced from the inner surface of the runner to permit passage of the material rearwardly past the ends of the screed member. The lever 92 is pivoted to the inner unit as at 93 but because the lower end of lever 92 is connected to the section 79 through the medium of link 96, floating of the inner unit will be permitted without having any effect on the end of the screed member.

The screed member 74 is further connected to the runner unit by a pair of rods 98 disposed adjacent each end of the screed member. One of the rods 98 of each pair is disposed at a higher level than the other rod thereof (Figures 1 and 8). The forward end of each rod is pivotally connected as at 99, to a bearing member 100 which is pivoted for swinging in a horizontal plane, in such a manner as to permit vertical swinging thereof. This bearing member 100 is pivotally connected as indicated to the screed member by a pivot structure 101 which is attached to the rear side of a vertically extending strap member 102 which is suitably attached to the screed member itself. The rear end of each of the rods 98 has a universal pivotal connection as at 103 (Figure 1) to the transversely extending beam 10 that aids in connecting the two runners together in such a manner as to permit swinging thereof in both horizontal and vertical planes. Each of the rods 98 has a turnbuckle 104 disposed therein by which the effective length thereof may be varied. It will be apparent that by shortening the upper rods 98 and lengthening the lower rods 98, the screed member may be tilted about its own axis so that the shoe or finishing member 77 of the screed will be tilted with its forward edge higher than its rear edge. With the screed tilted in this manner it will serve to bring about a better compaction of the material which it levels off and finishes.

I provide means for causing a very rapid vibration of the screed member 74. The rear surface of the screed member (Figures 1, 3, 8, and 9) is provided with a plurality of bearings 105 spaced longitudinally thereof. These bearings support for rotation a shaft 106 that extends longitudinally of the screed member. This shaft has a pair of weights 107 keyed thereon. These weights are substantially cylindrical in form and are eccentrically keyed on shaft 106. A weight 107 is disposed adjacent each end of the shaft and each weight is disposed between two of the bearings 105 which are spaced fairly close together. The weights are so disposed that they rotate in a vertical plane. Consequently, since they are eccentrically mounted on the shaft 106, when the shaft is rotated the screed member will be caused to rapidly vibrate. This serves to bring about better finishing and compacting of the material finished by the screed member. The shaft 106 is rotated by a suitable motor 108 through the medium of pulleys 109 and a belt 110.

The motor 108 is supported behind the screed member a suitable distance on a platform 111. This platform 111 has its ends secured to a pair of bars 112 (Figures 3 and 8) extending longitudinally of the machine and having their lower ends pivotally connected to the screed member as at 113. These bars have their outer ends joined together by a transversely extending rod 114. This rod 114 is pivotally connected to a transversely extending rod 115 disposed thereabove through the medium of a link 116 which is pivoted to both of these rods. The rod 115 has one end mounted on the longitudinally extending beam 42 and its other end on the beam 41 at the opposite side of the inner unit.

It will be apparent that even though the inner unit which is carried by the traction members does move up and down relative to the screed member and the runner unit, due to longitudinal irregularities in the surface upon which the traction wheels operate, it will not disturb the driving connection between the motor 108 and the shaft 106. Some of the vibration will be transmitted to the rear end of the frame of the inner unit and since this frame is pivoted on the pivot pins 58, the forward end of the frame of the inner unit will also be vibrated. This will vibrate the hopper and tend to prevent the material from sticking therein.

*The operation of the machine*

When the machine is to be operated, the screed member is first adjusted to its proper vertical position to produce a layer of material of the desired thickness. One end of the screed member may be adjusted to a position which is higher than the other end by the mechanism previously described. Also, the screed member may be tilted around its own axis if desired. The drum members 62 are rotated sufficiently to permit the runners to just rest on the ground and to be partly and resiliently supported on the inner unit. Material is dumped into the hopper 36 and the machine is then drawn along by any suitable means.

The material drops to the bottom of the hopper and the spreading member 43 spreads it laterally in both directions across the surface to be covered and compacts it against the inner surfaces of the runners. Thus, the machine will produce a layer of material with straight edges. The material spread by the spreading member is leveled off to the proper thickness and contour by the screed member disposed behind the spreading member. The screed member will furnish the layer and since the screed member will be vibrated, it assists in the initial compaction.

Although the traction wheels might operate on a rough surface, the longitudinal irregularities of such surface will not be reflected in the surface finished by the screed member. This is due to the fact that the inner unit only is supported by these traction wheels and this inner unit may float up and down relative to the outer runner unit without having any effect whatsoever on the runner unit. The screed member is carried by the runner members which are of comparatively great length and which will pass over the rough surface and will not follow the depressions and bumps of said surface. Thus, the surface produced by my machine will be very level and even and devoid of depressions and bumps. The runner members 1 extend behind the spreading member and the screed member a considerable distance and, consequently, these members will cooperate with the edges of the layer of material already spread in maintaining the machine on its course.

The machine may be operated to spread material over the surface at each side of the machine upon which the runners operate after the runners move along. Thus, it is possible to produce a layer of material which is wider than the distance between the runners. To accomplish this, the sections 79 at each end of the screed member may be adjusted to permit bleeding of some of the material past the ends of the screed member as previously described. As the machine moves along, this material which will be close to each runner will be leveled off and compacted by the auxiliary screed members disposed at the extreme rear ends of the runners. To cover the surface over which the runners passed, it will be necessary to adjust the auxiliary screed members to positions similar to that indicated in Figure 1 wherein the delimiting plates 17 will be spaced laterally outwardly from the runners. The auxiliary screed members will guide the material, which passed rearwardly of the screed member, outwardly behind the runners and the plates 17 will function as side forms, limiting spreading of the material and producing a straight edge thereon. The auxiliary screed members may be adjusted to the same level as the screed member 74 so that the edge portions of the layer of material will be of the same thickness as the inner portions thereof or varied as desired. The bleeding mechanism and the auxiliary screed member at one side of the machine may be operated independently of the corresponding members on the opposite side of the machine. In some cases it may be desirable to cover the surface over which one of the runners slides and not cover the surface over which the other runner slides.

The bleeding mechanism and the cooperating auxiliary screed members may be employed in obtaining a layer of material wider than the maximum distance between the two runners. However, as previously described, the machine is constructed throughout so that the distance between the runners may be varied in order to produce layers of material of different widths.

*Modifications*

Figure 11:
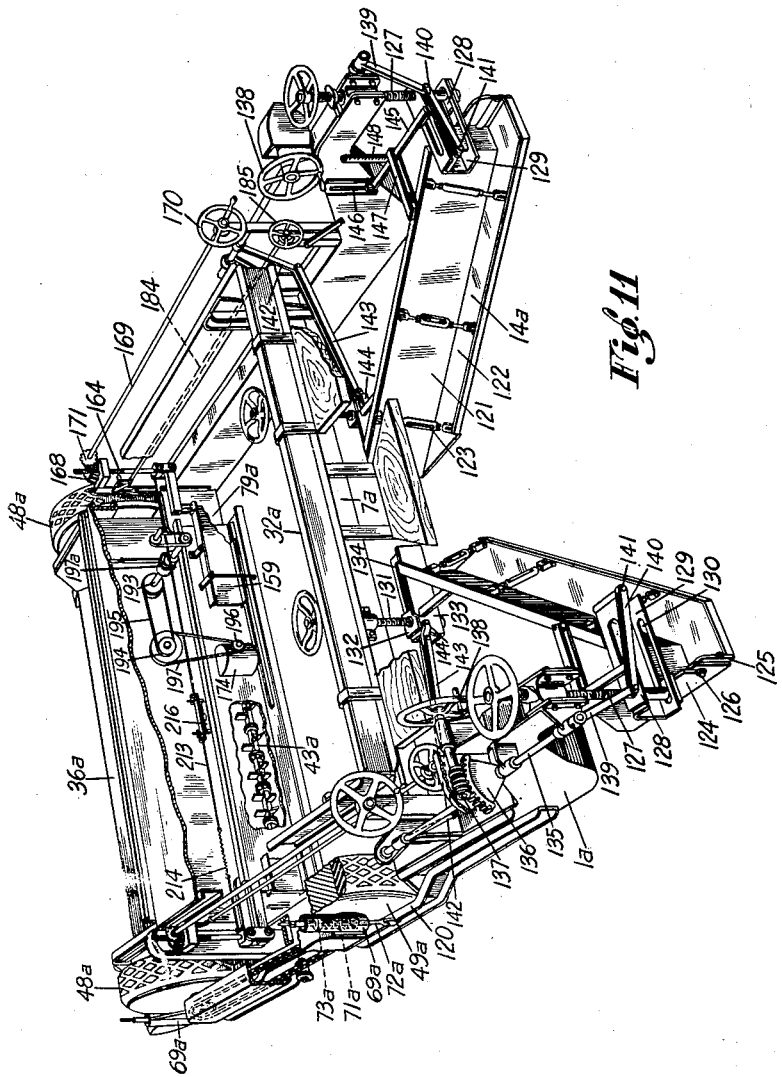
Figure 11 is a perspective view of a machine made in accordance with the principles of my invention but modified in several respects as compared to the machine illustrated in the preceding figures.

In Figure 11 I show a modification of my machine. The basic principles of this modification of the machine, however, are identical with those of the machine previously described. In this instance the machine comprises an outer runner unit and an inner or spreading unit that is free to float up and down without having any effect on the runner unit. The runner unit consists of a pair of runners 1a, as before, which are held together in spaced relation by telescoping beam members so that they may be adjusted farther apart or closer together. The inner or spreading unit 32a is mounted within the runner unit and is tied thereto, as before, in such a manner that it may float up and down relative to the runner unit. A pair of forward traction wheels 48a and a pair of rear traction wheels 49a are disposed in the runners. These wheels are mounted on the outer ends of axles which are slidably mounted on the inner unit 32a in a manner similar to the axles 51 of wheels 48 of the machine first described. Thus, the inner unit 32a is carried by the traction wheels and when the traction wheels operate over irregularities in the surface being covered, vertical movement of the inner unit will result but this will have no effect whatsoever on the runner unit. The traction wheels are adapted to be driven by means to be described in order to propel the machine along the surface to be covered.

In order to partly support the runner unit by the inner unit to prevent the generation of too much friction between the runners and the surface over which they slide, I provide slightly different resilient connections, in this instance, between the inner unit and the runner unit. In this instance a spring housing 69a is disposed adjacent each traction wheel and is rigidly carried by the outer end of the axle and, consequently, is carried by the inner unit. A rod 72a extends through this housing and its lower end is connected to a beam 120 which is rigidly secured to the runner. The housing 69a has a compression spring 71a disposed therein and the upper end of the rod has a disk 73a adjustably mounted thereon which bears against the upper end of spring 71a. Thus, the effect of the spring may be easily varied. The springs are adjusted to permit the runners to slide on the surface upon which they operate but to reduce the amount of friction produced.

As before, I provide auxiliary screed members which are mounted at the rear ends of the runners. However, the auxiliary screed members 14a are somewhat different from those previously described. Each auxiliary screed member 14a comprises a vertically disposed plate 121 and a plate 122 projecting rearwardly from the lower edge thereof. A plurality of turnbuckles 123 have their upper ends connected to the upper edge of the vertical plate 121 and their lower ends connected to the rear or outer edge of the plate 122. By means of these turnbuckles, the finishing plate member 122 may be tilted transversely of itself so that its forward edge will be higher than its rear edge and it will therefore exert a compacting action on the material which it strikes. Also, it may be bowed longitudinally of itself by the turnbuckles to produce the desired crown.

The auxiliary screed member 14a has a longitudinally extending delimiting plate unit 17a at its outer end which limits outward movement of material spread by the screed and which serves as a side form to shape the edge of such material. This unit 17a has an outer plate member 124 and an inner plate member 125 adjustable vertically relative to each other by means of bolt and slot connections 126. By this means, the plate 124 may be so adjusted that its lower edge will always be almost in contact with the surface of the ground, even though the auxiliary screed member is raised or lowered.

The rear end of the auxiliary screed member is mounted on the runner 1a by means of a vertically extending shaft 127 which is threaded through a bearing in the rear end 6a of the runner. The lower end of this shaft carries a substantially U-shaped guide 128 in which a U-shaped member 129 slides. This member 129 is welded or otherwise secured to the rear end of the auxiliary screed member 14a. The member 129 is provided with longitudinal slots 130 through which the lower end of shaft 127 passes and which permit sliding of the member 129 back and forth in the guide member 128.

The forward end of the auxiliary screed is mounted on the runner unit in a similar manner. A vertical shaft 131 is threaded through a suitable bearing carried by the transversely extending beam 7a adjacent the rear of the machine which connects the two runners rigidly together. A U-shaped guide 132 is carried by this shaft and a U-shaped member 133, which projects laterally from the rear end of the auxiliary screed member and is rigidly carried thereby, slides within this guide member. The member 133 is provided with longitudinal slots 134 through which the lower end of shaft 131 passes to permit sliding movement of member 133 in the guide 132. Thus, either end of the auxiliary screed 14a may be adjusted vertically independently of the other end by adjusting shaft 127 or shaft 131. Also, it will be apparent that the auxiliary screed may be adjusted in or out relative to the runners so that the plate unit 17a will be in alignment with the runners or will be spaced laterally therefrom.

The means for adjusting the auxiliary screed member in or out relative to the runner comprises a longitudinally extending shaft 135 which is mounted in suitable bearings on the runner. This shaft has a segmental gear 136 keyed thereon which is engaged by a worm 137 on the outer end of a short shaft which is rotatably mounted in a bearing on the runner and is rotatable by a hand wheel 138. At the rear end of this shaft a depending link 139 is mounted thereon by means of a collar at its upper end which is keyed thereto. The lower end of this link 139 is pivoted to the outer end of a link 140 which has its inner end pivoted at 141 to the inner end of the member 130 which is rigidly secured to the rear end of the auxiliary screed member. The forward end of shaft 135 passes through a collar on the upper end of a link 142 and is keyed thereto. The lower end of this link 142 is pivoted to the outer end of a link 143 which has its inner end pivoted at 144 to the member 133 which is rigidly secured to the forward end of the auxiliary screed member. Thus, it will be apparent that by rotating the hand wheel 138 either of the auxiliary screed members may be adjusted in or out relative to the runner.

In order to prevent the guide 128 from turning on the lower end of shaft 127 and for indicating the height of the rear end of the auxiliary screed, I provide a bar 145 which has its rear end welded or otherwise secured to the upper surface of member 128 and its forward end adjustably secured to the runner by a pin and slot connection 146. This bar 145 passes through a slot in a member 147 which extends outwardly from the upper edge of the auxiliary screed member. The bar 145 cooperates with a member 148 having calibrations thereon to indicate the level of the auxiliary screed.

The inner unit 32a carries a hopper 36a similar to that in the machine previously described. However, the spreading member 43a which is mounted in the bottom of the hopper is, in this instance, a screw spreading and beating member. This screw spreading and beating member 43a embodies two sections 149 (Figure 16) which feed the material in opposite directions and compact it against the inner surfaces of the runners. Each section 149 is made up of a plurality of smaller sections 150 which may be readily attached to or detached from each other when it is desirable to vary the length of the section 149 in order to produce layers of material of different widths. Thus, it is possible to remove a small section 150 of the section 149 or add other small sections 150 thereto. Each section 149 comprises a plurality of removable small blades 151 which are arranged helically on a shaft 152. When the shaft 152 is rotated by means to be described the section 149 will feed the material outwardly towards the runner. Because a plurality of small blades 151 are provided, asphalt or other bitumen material will not readily stick thereto. The small blades will beat the material and will break it up.

A screed member 74a is carried by the outer runner unit. Since this screed member is carried by the runner unit which is not affected by up and down movement of the inner unit 32a and since it is the member which finally finishes the layer of material produced, longitudinal irregularities in the surface being covered will be practically eliminated in the layer of material produced by the machine.

The screed member 74a is somewhat different from the screed member previously described. As shown in Figures 11 and 12, it embodies a forward vertically disposed plate 153 the lower edge of which is fastened to a rearwardly extending shoe or surfacing plate 154. This member 154 is fairly wide and has angle irons 155 secured to its upper surface adjacent its front and rear portions. The upper edge of the plate 153 has a rearwardly extending flange 156 of comparatively narrow width. The forward edge of the shoe or plate 154 is provided with a plurality of teeth 157 so that it will more effectively cut or break up sticky material.

The unit comprising plates 153 and 154 is secured to a transversely extending beam 159. Spaced brackets 159a are bolted to the upper surface of beam 159 and connected by bolt and slot connections to the rear surface of plate 153. Brackets 159b are bolted to the lower edge of beam 159 and are attached to an upstanding flange 154a adjacent the forward edge of plate 154. Bars 160 extend transversely of beam 159 and are secured on the upper edge thereof. These bars have open-ended slots into which the upper ends of hanger rods 160a may be slipped. A plurality of pairs of these hanger rods 160a are provided at longitudinally spaced intervals. Each of the rods is pivotally connected to angle iron 155 and the upper end is provided with nuts adjustably threaded thereon. It will be apparent that by proper adjustment of the nuts on the various rods, a crown may be produced in plate 154. Also, the plate may be tilted.

Each end of the screen 74a is spaced from the runner unit 1a. The screed is provided with a supporting extension 161 (Figure 12) which has its inner end rigidly secured to beam 159. This member 161 has its outer end pivotally connected to a pair of depending links 162. The upper ends of the links 162 are pivotally connected to a block 163. A vertically disposed shaft 164 has its lower end secured to this block and passes freely upwardly through a bearing 165 carried by upstanding supports 166 which project upwardly from the runner. The upper portion of the shaft is threaded as at 167 and a bevelled gear 168 is threaded thereon. It will be apparent that by rotating gear 168 in the proper direction, the shaft 164 may be vertically adjusted and consequently the end of the screed may be raised or lowered. In order to rotate bevelled gear 168 a longitudinally extending shaft 169 is provided. This shaft 169 is mounted in suitable bearings carried by the runner and extends to the rear of the machine where it may be rotated by means of a hand wheel 170. The forward end of the shaft 169 carries a bevelled gear 171 which meshes with the gear 168.

The screed member is positioned directly behind the hopper member and overlaps the rear wall thereof. As before, it will always extend below the lower edge of the hopper so that it will level off the material spread by the spreading member. Either end of the screed member may be adjusted vertically without affecting the other end.

I provide means for causing a very rapid vibration of the screed. This means comprises a cylindrical weight 172 (Figure 13) which is eccentrically keyed on a vertically disposed shaft 173 rotatably carried by a housing 174 which is bolted to the rear surface of the upstanding plate 153 of the screed member. This shaft 173 has a spiral gear 175 which meshes with a spiral gear 176 on a horizontally disposed shaft which is driven by means to be described. It will be apparent that when the eccentric weight is rotated it will cause a rapid vibration of the screed. This greatly enhances the finishing of the material by the screed. This movement will be permitted because the blocks 163 on the lower ends of shafts 164 are pivotally connected to the screed.

As previously stated, the ends of the screed are spaced from the runners. These spaces are provided to permit material to bleed back past the end of the screed and to be acted upon by the auxiliary screed members in a manner previously described in the discussion of the first machine. I provide means for governing this bleeding action. As shown in Figures 11 and 12, at each end of the screed a gate 79a is provided which overlaps the end of the screed considerably so as to permit varying of the distance between the two runners. This gate has its outer edge secured to a bar 177 which is mounted for vertical sliding movement in a vertically disposed guide 178 mounted on the runner and the upstanding support 166.

In order to raise and lower the gate 79a I provide a rigid right triangular frame 179 which is pivoted at the right angle thereof to one of the upstanding supports 166 on the runner as at 180. One end of this triangular frame is pivotally connected as at 181 to a vertically disposed link 182 which has its lower end pivoted to the upper end of bar 177. The opposite and lower end of the triangular frame is pivotally connected at 183 to a longitudinally extending shaft 184. This shaft 184 extends rearwardly to the rear end of the machine and is rotatably disposed in suitable bearings carried by the runner. It may be rotated by means of a hand wheel 185 to raise or lower the gate 79a in a manner which will be obvious. Thus, the amount of material which bleeds back past the ends of the screed member may be controlled. Each gate may be operated independently of the other.

All of the various hand wheels which are used for controlling the various adjusting members of the various parts of the machine are grouped at each side of the machine adjacent the rear thereof which will be apparent from Figure 11. This facilitates operation of the machine.

Figure 16:
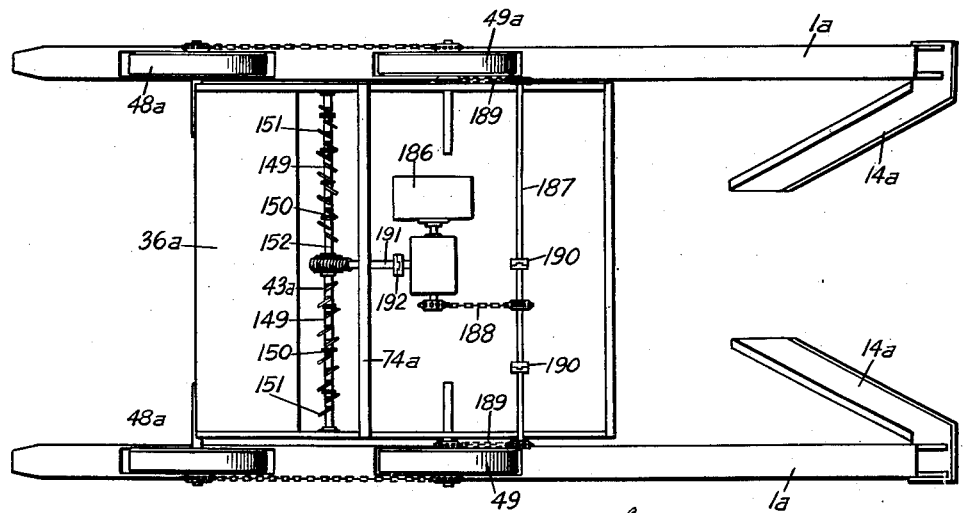
Figure 16 is a plan view of the machine shown in Figure 11.

The driving means for this machine is best shown in Figure 16. An engine 186 is shown which drives a transversely extending shaft 187 through the medium of a sprocket and chain drive 188. The outer ends of this shaft are operatively connected to the traction wheels by sprocket and chain drives 189, as shown. Clutches 190 are interposed in shaft 187 and may be operated so that the traction and propelling means at one side of the machine may be rendered operative while such means at the other side of the machine operates in order to facilitate guiding of the machine. The traction and propelling means at both sides of the machine may be rendered inoperative when desired.

The engine 186 drives the spreading member through the medium of a drive shaft 191. The spreading member may be rotated or prevented from rotating by operation of a clutch 192 interposed in shaft 191.

The shaft which carries spiral gear 176 and which rotates the eccentric weight 172 that vibrates the screed is driven in the following manner. A shaft 193 is driven by the engine through a suitable drive connection, as shown. This shaft drives a pulley 194 by means of a belt drive 195. The pulley 194 drives the pulley 196 on the outer end of the shaft extending from housing 174 by means of a belt drive 197. A clutch 197a is provided for rendering the driving means for the eccentric weight operative or inoperative. Thus, the screed may be vibrated when desired or the vibration means may be rendered inoperative.

In Figure 14 I show a slightly different type of screed and different means for reciprocating the screed transversely. In this instance the screed 74b embodies a plate unit 198 which is L-shaped in cross section and which is provided with a plurality of turnbuckles that may be used for tilting the finishing surface of the screed. This screed will be suspended in a suitable manner similar to that previously described so that it may be reciprocated transversely. Rollers 199 and 200 contact with the front and rear surfaces of a plate 201 rigidly secured to the back of the screed unit. The roller 200 operates in a groove 202 and is mounted on a shaft which is vertically slidable in its bearing. These rollers prevent friction being generated during transverse vibration of the screed and while the screed advances through the material.

The means for reciprocating the screed transversely in this instance comprises a rod 203 which has its lower end pivoted to the screed at 204. Its opposite end is pivoted at 205 to the lower end of a walking beam 206. This walking beam 206 is mounted on a stub shaft 207 which is carried by a support 208 mounted on the inner unit of the machine. The upper end of the walking beam 206 is pivoted to a rod 209 which has its opposite end connected to a ring 210a which embraces a circular eccentric block 210 that is keyed on the outer end of a shaft 211. The shaft 211 is driven by a motor 212 and clutch 213 is provided for rendering the shaft operative or inoperative. Rotation of the eccentric block 210 will cause oscillation of the walking beam 206. This, in turn, will cause transverse reciprocation of the screed.

*The screed level indicating means*

As previously stated, longitudinal irregularities will have substantially no effect on the surface produced by my machine. However, transverse irregularities in the surface being covered may sometimes necessitate adjustment of the screed member in order to prevent them from having any effect on the surface produced. Therefore, it is desirable to have some indicating means for indicating at all times the level of the screed, as compared to a given grade line, so that the operator may readily adjust the screed to compensate for such irregularities so that the surface produced by the machine will not only be substantially free from irregularities longitudinally thereof but will also be substantially free from irregularities transversely thereof thereby producing a true contour or crown when building roads in lanes or sections.

In Figure 15 I show indicating mechanism which I may use. This indicating mechanism embodies a line or wire 213 which is stretched transversely of the machine. This line is preferably connected to the blocks 163 which are supported on the lower ends of shafts 164 disposed at the ends of the screed unit (Figures 11 and 12) and which are used for vertically adjusting the screed member. When the line is applied to the screed member each end thereof is the same distance from the lowermost edge of the corresponding end of the screed member. Furthermore, since the ends of the line are connected to members which move with the screed member upon vertical adjustment thereof, the relative positions of the screed and line will always be the same. The line is provided with a spring 214 interposed therein to keep it taut.

Disposed substantially midway between the ends of line 213 is a bar 215. This bar has a level 216 mounted thereon. This level is that type which embodies a tube which is substantially filled with liquid but has a bubble therein. Each end of the level 216 is pivotally connected at 217 to the lower end of a bolt 218 which passes upwardly through the bar 215 and has a wing nut 219 threaded thereon. The level is also provided with a pair of upstanding arms 220 which project up through slots 221 in the bar 215. These arms preferably have suitable calibrations thereon for indicating whether or not the level is parallel to the line 213. It will be apparent that the level may be readily adjusted so that it will be tilted relative to the line.

Figure 17:
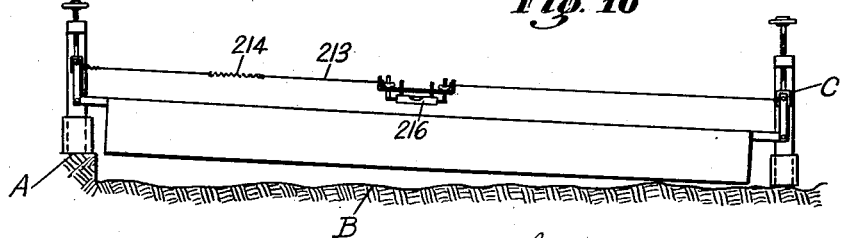
Figure 17 is a transverse section of the machine, more or less diagrammatic, showing the level indicating means applied to the screed unit and illustrating the screed and level indicating means before they are properly adjusted.
Figure 18:
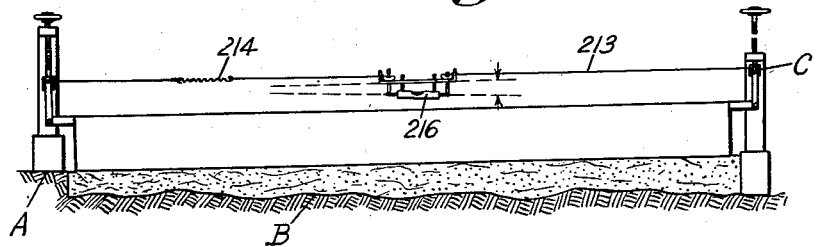
Figure 18 is a view similar to Figure 17 but illustrating the screed member and the level indicating means properly adjusted.

In Figures 17 and 18, I illustrate how this level indicating means functions. Figure 17 illustrates the machine being used to lay one lane of a road which is to be composed of several lanes. One runner is shown operating on a concrete header A at fixed grade at the edge of the road and the other runner on the rough surface B to be covered. The indicating mechanism in this instance and also the screed member are not yet adjusted properly.

The ends of the screed member are then vertically adjusted so that the screed will be at such a level, as compared to the given grade line, that it will level off the material to the proper crown. In this instance the screed will be tilted transversely of the road. If the level is parallel to the line, the bubble will not be in level indicating position. Therefore, the level is adjusted so that it will be tilted at an angle relative to the line 213 until the bubble is in level indicating position. As the machine moves along, the inner runner may run into a "dip" or may run up on a "wave" occurring transversely in the surface B. Thus, the inner runner may rise or fall. However, when this happens the bubble of the level will indicate that the level of the screed relative to the given grade line is not proper. Therefore, the operator may adjust the end C of the screed to bring the bubble back to level indicating position. It will be understood that the screed member is initially adjusted to the proper level relative to the given grade line and that the level is adjusted to level indicating position when the screed is so adjusted. Therefore, thereafter it is only necessary for the operator to keep the screed adjusted so that the bubble of the level will always be in level indicating position. Thus, the indicating mechanism will indicate the position of the screed relative to the given grade line at all times and the operator may readily adjust the screed to keep it at its proper level so that transverse irregularities in the surface being covered will have substantially no effect on the crown produced by my machine.

It will be apparent from the preceding description that I have provided a machine having numerous advantageous features. Some of these features have been specifically pointed out in the preceding description and others will be apparent from the specification, drawings and the following claims.

By the term "screed member" used in the following claims, I intend to cover any member which is used for leveling off the material to the desired thickness and contour, such as a strike-off plate and other equivalent members.

Having thus described my invention, what I claim is:

1. A machine of the type described comprising a runner unit including a plurality of runner members which move along the surface to be treated and serve as side forms, a spreading unit, means for tying said runner unit to said spreading unit, said means permitting said units to float vertically relative to each other during movement over the surface to be covered by preventing substantial relative lateral movement between said units, a main screed member carried by said runner members, means for permitting material to feed back past said screed member, said means comprising adjustable gates disposed at points adjacent the ends thereof, and an auxiliary screed member disposed rearwardly of said main screed member for operating upon the material that feeds past said main screed member.

2. A machine of the type described comprising a runner unit including a pair of runner members which move along the surface to be treated, a spreading unit, means for tying said spreading unit to said runner unit, said means permitting said units to float vertically relative to each other during movement over the surface to be covered but preventing substantial relative lateral movement between said units, a main screed member carried between said runner members, and extending transversely substantially at right angles to said runner members, means for permitting material to feed back past the ends of said main screed member and including adjustable gates carried at the ends thereof, and auxiliary screed members carried by said runners rearwardly of said main screed member for operating upon the material that feeds past said main screed member.

3. A machine of the type described comprising a runner unit including a plurality of longitudinally extending runner members of considerable length which move along the surface to be treated, a spreading unit, means for tying said spreading unit to said runner unit, said means permitting said units to float vertically relative to each other during movement over the surface to be covered but preventing substantial relative lateral movement between said units, a main screed member carried by said runner members substantially midway between the ends thereof, means for permitting material to feed back past said main screed member and including an adjustable gate, and an auxiliary screed member disposed rearwardly of said main screed member for operating upon material that feeds back past said main screed member.

4. A machine of the type described including a pair of runner members which move along the surface to be treated, a main screed member carried by said runner members, means for permitting material to bleed back past the ends of said main screed member, said means being adjustable gates disposed at the ends thereof, and auxiliary screed members carried by said runners rearwardly of said main screed members for operating upon the material that bleeds back past said main screed member, said auxiliary screed members being vertically and laterally adjustable relative to said runner members.

5. A machine of the type described including a plurality of runner members which move along the surface to be treated, a spreading unit, said spreading unit being tied to said runner members in such a manner that it may float automatically up and down relative thereto during movement of the machine along the surface to be covered, a main screed member for leveling off material spread by said spreading unit, said screed member being carried by said runner members, means for permitting material to bleed back past said main screed member, and an auxiliary screed member disposed rearwardly of said main screed member for operating upon material that bleeds back past said main screed member.

6. A machine of the type described including a runner unit embodying a plurality of runner members, a spreading unit, said spreading unit being tied to said runner unit in such a manner that it may float automatically up and down relative thereto during movement of the machine along the surface to be covered, a main screed member carried by said runner unit for leveling off material spread by said spreading unit, means for permitting material to bleed back past said screed member adjacent each runner member, and auxiliary screed members carried by the runner members for operating upon the material that bleeds back past said main screed member.

7. A machine of the type described comprising a runner unit, composed of a pair of runners, a spreading unit carried by transporting means which operate outside of the inner surface of said runners, means for tying said spreading unit and said runner unit together in such a manner as to permit the spreading unit to float automatically up and down relative to the runner unit during movement of the machine along the surface to be covered, means for preventing substantial relative lateral movement between said units, said spreading unit including rearwardly diverging spreading blades for spreading the material laterally of the surface being covered.

8. A machine of the type described comprising a runner unit, a second unit tied to said runner unit in such a manner that it may float automatically up and down relative thereto during movement of the machine along the surface to be covered, means for preventing substantial relative lateral movement between said units, said second unit being carried by traction members operating outside of the inner edges or surfaces of the runner members of said runner unit, and adjustable means for causing the weight of the runner unit to be partly supported by the second unit in order to minimize friction developed by the runners sliding along the surface to be covered.

9. A machine of the type described comprising a runner unit, a spreading unit tied to said runner unit in such a manner that it may float automatically up and down relative thereto during movement of the machine along the surface to be covered, means for preventing substantial relative lateral movement between said units during the floating action, a screed member carried by the runner unit, and means for tilting the entire screed member about its own axis.

10. A machine of the type described comprising a runner unit, embodying a pair of runners joined together but spaced laterally from each other, a finishing member carried by said runners, means for permitting variation of the distance between said runner members, and a second unit tied to said runner unit in such a manner that it may float automatically up and down relative thereto during movement of the machine along the surface to be covered, and means for preventing substantial relative lateral movement between said units during the floating action.

11. A machine of the type described comprising a runner unit embodying a pair of runners joined together but spaced laterally from each other, a finishing member carried by said runners, means for permitting variation of the distance between said runner members, a second unit tied to said runner unit in such a manner that it may float automatically up and down relative thereto during movement of the machine along the surface to be covered, means for preventing substantial relative lateral movement between said units during the floating action, said second unit being supported on traction members which operate outside of the inner surfaces of the runners of said runner unit, said traction members being mounted in such a manner that they may be moved laterally to permit variation of the distance between said runners.

12. A machine of the type described comprising a screed member, means for vertically adjusting said screed member, level indicating means mounted to move vertically with the screed member when it is adjusted, said level indicating means being initially positioned to indicate whether or not the screed member is level; said level indicating means being adjustable relative to the screed member in such a manner that it will be in level indicating position even though the screed is not level.

13. A machine of the type described comprising a screed member, means for vertically adjusting said screed member, level indicating means, said level indicating means comprising a line extending transversely of the screed member and movable vertically with the screed member, said line having its ends spaced equal distances from the lowermost edge of the screed member, a level member mounted on said line, and means for adjusting said level member so that it will be parallel to the line or will be tilted relative thereto.

14. A machine of the type described comprising a runner unit including a plurality of runner members, a second unit tied to said runner unit in such a manner that it may float automatically up and down relative thereto during movement of the machine along the surface to be covered, said second unit being supported on traction wheels which are disposed within the runner members and are substantially in alignment therewith.

15. A machine of the type described comprising a runner unit including a plurality of runner members, a second unit tied to said runner unit in such a manner that it may float automatically up and down relative thereto during movement of the machine along the surface to be covered, said second unit being carried by traction wheels which operate along the same paths along which the runners operate.

16. A machine of the type described comprising a runner unit, a second unit tied to said runner unit in such a manner that it may float automatically up and down relative thereto, said second unit being carried by traction members operating outside of the inner surfaces of the runner members of said runner unit, and adjustable means for causing the weight of the runner unit to be partly supported by the second unit in order to minimize friction developed by the runners sliding along the surface to be covered, said means including springs connected to the runner unit and to said second unit.

17. A machine of the type described comprising a runner unit including a plurality of runner members which move along the surface to be treated, a spreading unit for spreading the material on the surface to be covered, said spreading unit including a material receiving hopper, means for tying said runner unit to said spreading unit, said means permitting said units to float vertically relative to each other during movement over the surface to be covered, a main finishing member for leveling off material spread by said spreading unit, said member being so constructed and arranged as to permit part of the material to feed rearwardly thereof as the machine progresses over the surface to be covered, and an auxiliary finishing member carried by the runner unit at a point rearwardly of the main finishing member for operating upon the material that feeds rearwardly past said main finishing member.

18. A machine of the type described comprising a runner unit including a pair of longitudinally extending runner members which are adapted to slide along the surface to be covered, a second unit including a material receiving hopper supported on transporting members, means for tying said runner unit to said second unit, said means permitting said units to float vertically relative to each other during movement over the surface to be covered, a main finishing member for leveling off material spread by said spreading unit, said member being so constructed and arranged as to permit part of the material to feed rearwardly thereof at points adjacent the ends thereof and adjacent said runner members as the machine progresses over the surface to be covered, and an auxiliary finishing member carried by each runner member at a point rearwardly of the main finishing member, said auxiliary finishing members operating upon material that feeds rearwardly past said main finishing member.

19. A machine of the type described including a plurality of runner members which move along the surface to be covered, a spreading unit, means for connecting said spreading unit to said runner members in such a manner as to permit the spreading unit and the runner members to float vertically relative to each other, a main screed member carried by said runner members, said main screed member being so constructed and arranged as to permit material to feed rearwardly thereof during movement of the machine over the surface to be covered, and auxiliary screed members carried by said runner members at a point rearwardly of the main screed member for operating upon the material that feeds rearwardly of said main screed member.

20. A machine of the type described comprising a unit carried by transporting means, a second unit independent of the first unit, means for connecting said units together in such a manner as to permit them to float vertically relative to each other during movement of the machine over the surface to be covered but to prevent substantial relative lateral movement between said units, said second unit including a plurality of runner members which move along the surface to be treated, a main screed member carried by said runner members, and auxiliary screed members carried by said runner members for spreading material laterally behind and beyond the advancing runner members and for leveling off said material.

21. A machine of the type described comprising a unit carried by transporting means, a second unit independent of the first unit, means for connecting said units together in such a manner as to permit them to float vertically relative to each other during movement of the machine over the surface to be covered, said second unit including a plurality of runner members which move along the surface to be treated, a main screed member carried by said runner members, said main screed member being so constructed and arranged relative to the runner members that material will feed rearwardly past the ends thereof, and auxiliary screed members carried by said runner members for spreading said material laterally behind and beyond the advancing runner members and for leveling off said material, and means for limiting lateral movement of the material spread by said auxiliary screed members.

22. A machine of the type described comprising a runner unit embodying a plurality of runners that slide along the surface to be covered and bridge the irregularities thereof, a spreading unit carried by transporting means, said spreading unit including a material receiving hopper, rearwardly diverging spreading blades for spreading the material laterally of the surface being covered mounted in the bottom of said hopper, and means for tying said units together and preventing substantial relative lateral movement therebetween, said means permitting free vertical movement of the spreading unit relative to the runner unit so that vertical movement of the spreading unit caused by the transporting means operating over a rough surface will not be transmitted to said runner unit.

23. A machine of the type described comprising a runner unit embodying a plurality of runners that slide along the surface to be covered and bridge the irregularities thereof, a second unit carried by transporting means, a screed member carried by said runner unit, means for vibrating said screed member, and means for tying said units together and preventing substantial relative lateral movement therebetween, said means permitting free vertical movement of the second unit relative to the runner unit so that vertical movement of the second unit caused by the transporting means operating over a rough surface will not be transmitted to said runner unit.

24. A machine of the type described comprising a runner unit embodying a plurality of runners that slide along the surface to be covered and bridge the irregularities thereof, a second unit carried by transporting means, a screed member carried by said runner units, means for vibrating said screed member, said means comprising a rotatable eccentrically mounted weight member, and means for tying said units together and preventing substantial relative lateral movement therebetween, said means permitting free vertical movement of the second unit relative to the runner unit so that vertical movement of the second unit caused by the transporting means operating over a rough surface will not be transmitted to said runner unit.

25. A machine of the type described comprising a runner unit including a plurality of runner members which move along the surface to be covered and bridge the irregularities thereof, a spreading unit carried by transporting means for spreading the material on the surface to be covered, a main finishing member carried by said runner unit for leveling off material spread by said spreading unit, said member being so constructed as to permit part of the material to feed rearwardly thereof as the machine progresses over the surface to be covered, an auxiliary finishing member carried by the runner unit at a point rearwardly of the main finishing member for operating upon the material that feeds rearwardly past said main finishing member, and means for tying said units together and preventing substantial relative lateral movement therebetween, said means permitting free vertical movement of the spreading unit relative to the runner unit so that vertical movement of the spreading unit caused by the transporting means operating over a rough surface will not be transmitted to said runner unit.

26. A machine of the type described comprising a runner unit including a plurality of runners which move along the surface to be treated and bridge the irregularities thereof, a second unit independent of said runner unit and carried by transporting means, means on said machine for spreading the material laterally across the surface to be treated, other means carried by the runners for spreading material laterally of the runners, and means for tying said units together and preventing substantial relative lateral movement therebetween, said means permitting free vertical movement of the spreading unit relative to the runner unit so that vertical movement of the spreading unit caused by the transporting means operating over a rough surface will not be transmitted to said runner unit.

27. A machine of the type described comprising a runner unit including a plurality of runners which slide along the surface to be treated and bridge the irregularities thereof, a second unit independent of said runner unit and carried by transporting means, means for tying said units together and preventing substantial relative lateral movement therebetween, said means permitting free vertical movement of the spreading unit relative to the runner unit so that vertical movement of the spreading unit caused by the transporting means operating over a rough surface will not be transmitted to said runner unit, and adjustable means for causing the weight of the runner unit to be partly supported by the second unit in order to minimize friction developed by the runners sliding along the surface to be covered, said means including springs connected to the runner unit and to said second unit.

JOSEPH H. MOSEL.